(12) United States Patent  
Kuya et al.

(10) Patent No.: US 8,364,458 B2
(45) Date of Patent: Jan. 29, 2013

(54) SIMULATION PROGRAM AND SIMULATION APPARATUS

(75) Inventors: Ryo Kuya, Kawasaki (JP); Yasuki Nakamura, Kawasaki (JP); Tatsuya Yoshino, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 453 days.

(21) Appl. No.: 12/618,137

(22) Filed: Nov. 13, 2009

(65) Prior Publication Data

US 2010/0169068 A1 Jul. 1, 2010

(30) Foreign Application Priority Data

Dec. 25, 2008 (JP) ................................. 2008-330113

(51) Int. Cl.
*G06F 17/50* (2006.01)
*G06G 7/62* (2006.01)
(52) U.S. Cl. .......................................... 703/13; 716/136
(58) Field of Classification Search ...................... 703/13
See application file for complete search history.

(56) References Cited

U.S. PATENT DOCUMENTS

| 5,870,588 | A  | * | 2/1999  | Rompaey et al. | ............... | 703/13  |
| 6,230,114 | B1 | * | 5/2001  | Hellestrand et al. | ............ | 703/13  |
| 6,263,303 | B1 | * | 7/2001  | Yu et al. | ........................... | 703/19  |
| 7,146,300 | B2 | * | 12/2006 | Zammit et al. | ................... | 703/13  |
| 8,051,402 | B2 | * | 11/2011 | Snell | ............................. | 716/136 |

FOREIGN PATENT DOCUMENTS

| JP | 2002-215703 | 8/2002 |
| JP | 2005-18623 | 1/2005 |

OTHER PUBLICATIONS

Gawanmeh et al, "An Executable Operational Semantics for SystemC Using Abstract State Machines", Technical Report, Concordia University, Mar. 2004.*
Peng et al, "An Operational Semantics of an Event-Driven System-level Simulator", 30th Annual IEEE/NASA Software Engineering Workshop, Apr. 2006.*
Shin et al, "Automatic Generation of Transaction-Level Models for Rapid Design Space Exploration", CODES+ISSS'06, Oct. 22-25, 2006.*
Chevalier et al, A SystemC Refinement Methodology for Embedded Software, IEEE Design & Test of Computers, 2006.*

* cited by examiner

*Primary Examiner* — Mary C Jacob
(74) *Attorney, Agent, or Firm* — Staas & Halsey LLP

(57) ABSTRACT

A simulation program stored in a computer readable recording medium to execute a simulation of first and second simulation objects is provided. The simulation program includes a storage that stores one of an initial state, a read waiting state and a write waiting state for a channel used for data transfer between the first and second simulation objects; a receiver that receives a read request from the first simulation object to the second simulation object through the channel; a judgment unit which, upon reception of the read request, judges whether a state corresponding to the channel is the read waiting state; a transmitter which transmits data corresponding to the channel stored in a storage area to the first simulation object when judging to be the read waiting state; and a changer that changes the state to the initial state based on the data transmission.

16 Claims, 12 Drawing Sheets

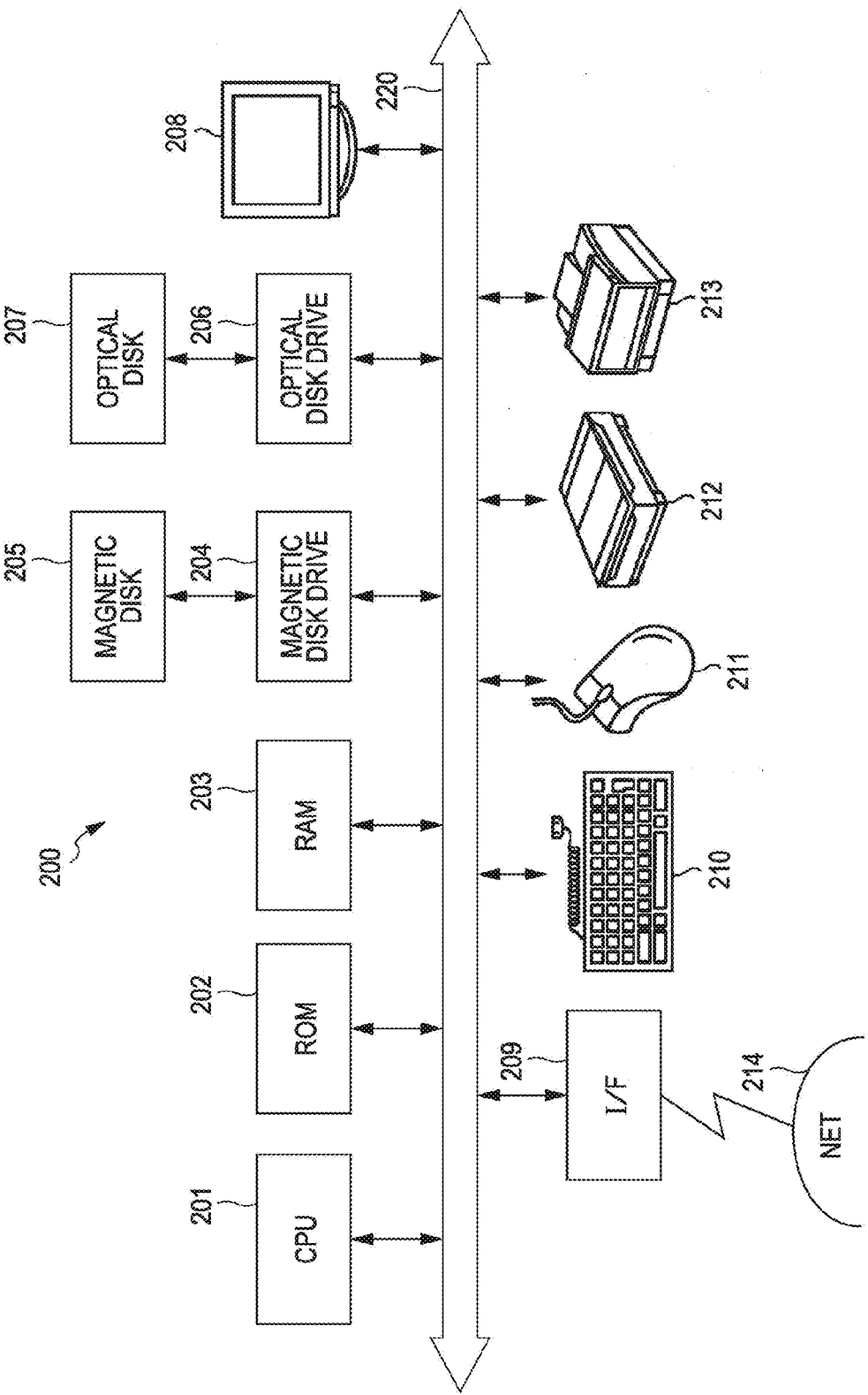

FIG. 4

```
#include "task.h"

TASK(USER PROGRAM P1)
{
    int data;

/* READ FROM HW
     * READ DATA FROM HW THROUGH
     * CHANNEL C1
     * WHEN DATA BECOMES OTHER THAN 0, PROCEEDS
     * TO "processing...." */
401─┤ while((data=read(C1))==0) {}

/* processing... */

/* WRITE IN HW
     * WRITE DATA IN HW THROUGH
     * CHANNEL C2 */
402─┤ while(C2, data);

/* CALL OSEK API */
    Terminate Task();
}
```

```
#include "HardwareModel.h"

void HardwareModel::thread()
{
    int data=1;

while (true)
    {
        /* WRITE INTO SW */
        write (C1,data);         ← 501

/* WAIT 42 μs */
        wait (42,SC_US);         ← 502

/* READ FROM SW */
        data=read(C2);           ← 503

/* WAIT 42 ms */
        wait (42,SC_MS);
    }
}
```

| CH NO. | STATUS FLAG | | |
|---|---|---|---|
| | INITIAL STATE | write WAITING STATE | read WAITING STATE |
| $C_1$ | ON | OFF | OFF |
| $C_2$ | ON | OFF | OFF |
| ... | ... | ... | ... |
| $C_i$ | ON | OFF | OFF |
| ... | ... | ... | ... |
| $C_n$ | ON | OFF | OFF |

FIG. 10A

| CH NO. | STATUS FLAG | | |
|---|---|---|---|
| | INITIAL STATE | write WAITING STATE | read WAITING STATE |
| Ci | OFF | OFF | ON |

| CH NO. | STATUS FLAG | | |
|---|---|---|---|
| | INITIAL STATE | write WAITING STATE | read WAITING STATE |
| Ci | ON | OFF | OFF |

FIG. 10B

| CH NO. | STATUS FLAG | | |
|---|---|---|---|
| | INITIAL STATE | write WAITING STATE | read WAITING STATE |
| Ci | ON | OFF | OFF |

| CH NO. | STATUS FLAG | | |
|---|---|---|---|
| | INITIAL STATE | write WAITING STATE | read WAITING STATE |
| Ci | OFF | ON | OFF |

FIG. 10C

| CH NO. | STATUS FLAG | | |
|---|---|---|---|
| | INITIAL STATE | write WAITING STATE | read WAITING STATE |
| Ci | OFF | ON | OFF |

| CH NO. | STATUS FLAG | | |
|---|---|---|---|
| | INITIAL STATE | write WAITING STATE | read WAITING STATE |
| Ci | OFF | OFF | ON |

FIG. 10D

| CH NO. | STATUS FLAG | | |
|---|---|---|---|
| | INITIAL STATE | write WAITING STATE | read WAITING STATE |
| Ci | ON | OFF | OFF |

| CH NO. | STATUS FLAG | | |
|---|---|---|---|
| | INITIAL STATE | write WAITING STATE | read WAITING STATE |
| Ci | OFF | OFF | ON |

US 8,364,458 B2

SIMULATION PROGRAM AND SIMULATION APPARATUS

CROSS-REFERENCE TO RELATED APPLICATIONS

This application claims the benefit of priority from Japanese Patent Application No. 2008-330113 filed on Dec. 25, 2008, the entire contents of which are incorporated herein by reference.

BACKGROUND

1. Field

Embodiments discussed herein relate to a simulation of a hardware model and a software program.

2. Description of the Related Art

When a system in which hardware and software coexist is developed, the simulation of the whole system of the hardware and the software is performed. A high-speed simulator may be required to develop a system of high quality in a short period of time.

The related techniques are disclosed in Japanese Laid-open Patent Publication No. 2005-18623 and Japanese Laid-open Patent Publication No. 2002-215703.

SUMMARY

According to one aspect of the embodiments, a simulation program stored in a computer readable recording medium to execute a simulation of first and second simulation objects is provided which includes a storage that stores one of an initial state, a read waiting state and a write waiting state for a channel used for data transfer between the first simulation object and the second simulation object; a receiver that receives a read request from the first simulation object to the second simulation object through the channel during the simulation; a judgment unit which, upon reception of the read request, judges whether a state corresponding to the channel is the read waiting state or not; a transmitter which transmits data corresponding to the channel stored in a storage area to the first simulation object when judging to be the read waiting state; and a changer that changes the state corresponding to the channel to the initial state based on the data transmission.

Additional advantages and novel features of the invention will be set forth in part in the description that follows, and in part will become more apparent to those skilled in the art upon examination of the following or upon learning by practice of the invention.

The above-described embodiments of the present invention are intended as examples, and all embodiments of the present invention are not limited to including the features described above.

BRIEF DESCRIPTION OF THE DRAWINGS

FIG. 2 illustrates an exemplary simulation apparatus;
FIG. 4 illustrates an exemplary user program;
FIG. 5 illustrates an exemplary hardware model;
FIG. 7 illustrates an exemplary status table;
FIGS. 10A, 10B, 10C and 10D illustrate an exemplary change process.

DETAILED DESCRIPTION OF THE PREFERRED EMBODIMENTS

Figures 1A, 1B:
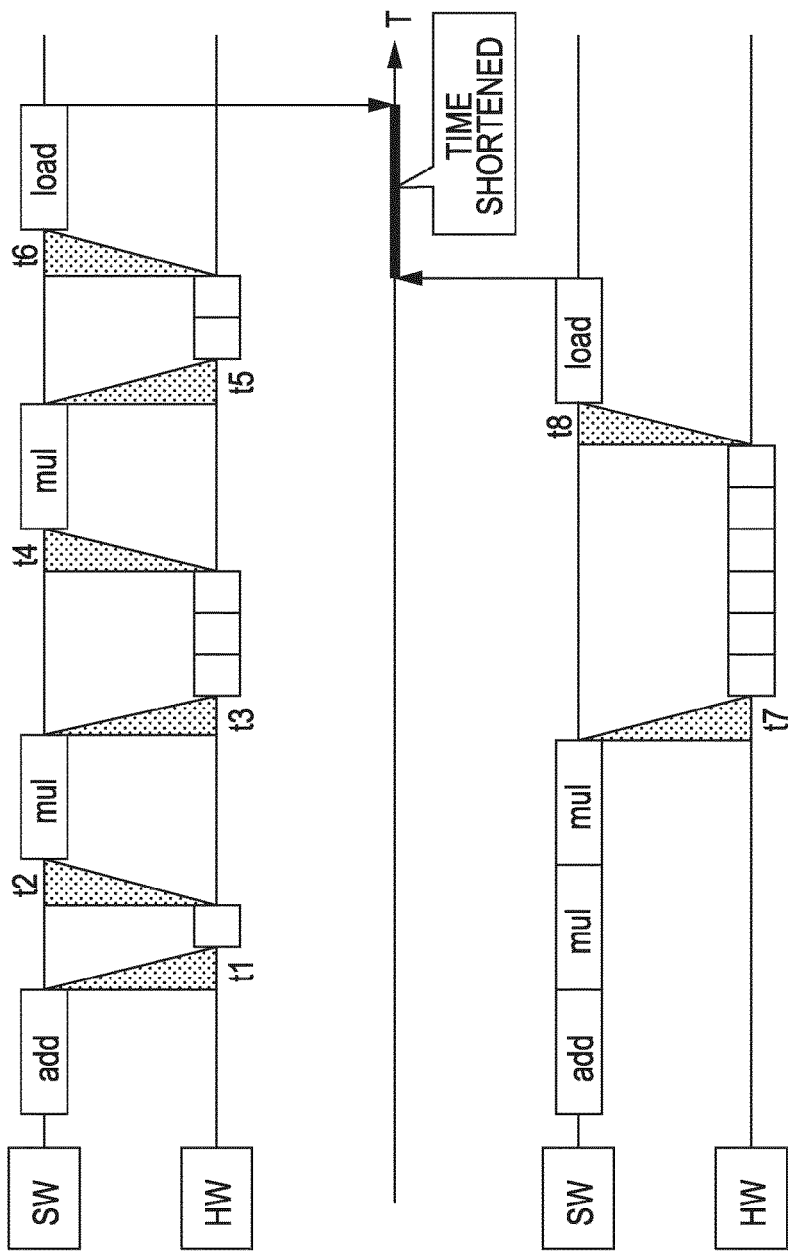
FIGS. 1A and 1B illustrate an exemplary scheduling system.

Reference may now be made in detail to embodiments of the present invention, examples of which are illustrated in the accompanying drawings, wherein like reference numerals refer to like elements throughout.

In the simulation of a hardware model and software, an instruction set simulator (ISS) may be used for executing the simulation by instruction. The ISS executes the simulation of the hardware and the software while scheduling with a simulator for simulating peripheral circuits by instruction.

The scheduling may be carried out regardless of the processing of the software. The scheduling, which has no effect on the simulation result, may be executed.

FIGS. 1A and 1B illustrate an exemplary scheduling system. In FIGS. 1A and 1B, the operation result of the hardware model designated as "HW" is read in response to a load instruction of the software designated as "SW".

In FIGS. 1A and 1B, reference characters t1 to t8 designate the overhead of the scheduling. The symbol □ indicates the time to advance the simulation time of the hardware model in accordance with the software instruction execution time. The time axis T indicates the time required for simulation. For example, the operation of the hardware model may be completed when an add instruction or a mul instruction of the software ends.

In the scheduling system illustrated in FIG. 1A, the scheduling of the software is executed for each instruction, for example, an add instruction or a mul instruction. After the software instruction is executed, the scheduling is carried out, and the simulation time of the hardware model is advanced for the execution time □.

In the scheduling system illustrated in FIG. 1A, the hardware model and the software may not cooperate regardless of the instruction, and the scheduling for matching the simulation time is performed for each instruction. The scheduling may include the one having no effect on the simulation result.

The add instruction or the mul instruction, for example, may not cooperate with the hardware model. Therefore, the simulation time may not be matched. Before execution of a load instruction, for example, the simulation time of the hardware model may be matched and other scheduling that has no effect on the simulation result may not be carried out.

With the increase of the scheduling or the number of times the context switch is operated in the simulator, the simulation speed may be reduced.

In the scheduling system illustrated in FIG. 1B, the scheduling is conducted based on the timing of exchanging the data interdependent between the hardware model HW and the software SW. The load instruction of software and the hardware model are interdependent, and therefore, the scheduling is conducted before the load instruction.

The scheduling is conducted in such a manner as to maintain the order in which the data interdependent between the hardware model HW and the software SW are exchanged with each other. The scheduling having no effect on the simulation result is reduced, and therefore, the simulation time may be shortened.

FIG. 2 illustrates an exemplary simulation apparatus. The simulation apparatus 200 as hardware includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212 and a printer 213. Each component part is coupled to a bus 220.

The CPU 201 controls the simulation apparatus 200 as a whole. The ROM 202 stores the program such as the boot program. The RAM 203 may be used as a work area, for example, of the CPU 201. The magnetic disk drive 204, based on the command from the CPU 201, reads the data from and writes the data into the magnetic disk 205. The data is written into the magnetic disk 205 by the magnetic disk drive 204.

The optical disk drive 206, based on the command from the CPU 201, reads the data from and writes the data into the optical disk 207. The data is written into the optical disk 207 by the optical disk drive 206. The computer reads the data stored in the optical disk 207.

The display 208 displays the cursor, the icon, the tool box, the text, the image or the data such as the function information. The display 208 includes a CRT, a TFT liquid crystal display or a plasma display, for example.

The interface I/F 209 is coupled to a network 214 such as the local area network (LAN), the wide area network (WAN) or the internet through a communication line, and is coupled to other devices through the network 214. The I/F 209 functions as an interface between the network 214 and the internal components of the apparatus, and controls the data input/output from an external device. The I/F 209 includes a modem or a LAN adaptor, for example.

The keyboard 210 includes keys for inputting characters, numerals and various commands to input data. The keyboard 210 may include an input pad or a ten-key board of the touch panel type. The mouse 211 moves the cursor, selects the range, moves the window or changes the window size. The mouse 211 has the function as a pointing device and may include a track ball or a joystick.

The scanner 212 reads the image optically, and fetches the image data into the simulation apparatus 200. The scanner 212 may include the function as an optical character reader (OCR). The printer 213 prints the image data and the text data. The printer 213 may include the laser printer or the ink-jet printer, for example.

Figure 3:
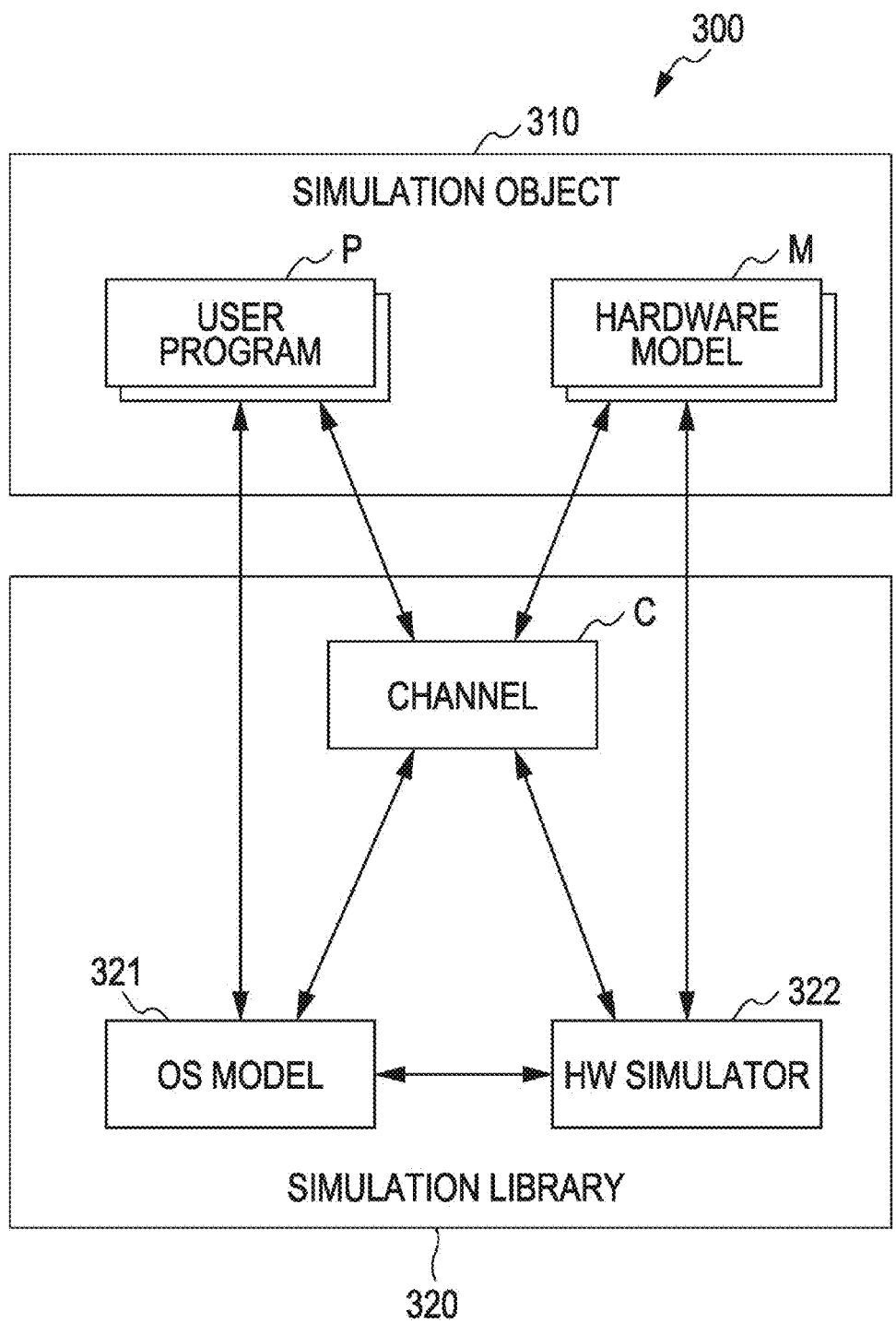
FIG. 3 illustrates an exemplary simulation system.

FIG. 3 illustrates an exemplary simulation system. The simulation system 300 includes a simulation object 310 and a simulation library 320.

The simulation object 310 includes a user program P and a hardware model M. The user program P may be the software as a simulation object. The user program P includes a task program operating on the operation system (target OS) constituting a target and an interrupt service routine (ISR) program. The hardware model M may be a model of the hardware as an object of simulation.

The simulation library 320 includes an OS model 321, a HW simulator 322 and a channel C. The OS model 321 schedules the user program P. The OS model 321 may include an OSEK, for example. The HW simulator 322 simulates the hardware model M. The HW simulator 322 may include a system C, for example.

The channel C may be a data path used to exchange data between the hardware model M and the user program P. The channel C may couple the user program P and the hardware model M in one-to-one relation. The channel C may be provided for each one-way connection, for example, from the user program P to the hardware model M or from the hardware model M to the user program P. For example, the channel C may couple the task or the ISR in the user program P and the hardware model M to each other in a one-to-one relationship.

The channel C processes the write request from one of the hardware model M and the user program P to the other. The channel C processes the read request from one of the hardware model M and the user program P to the other. When one of the hardware model M and the user program P transfers to the read waiting state or the write waiting state, the channel C suspends the simulation of the particular one transferring to the waiting state. The channel may include a plurality of channels C1 to Cn.

The simulation system 300 verifies the behavior of the user program P operating on the object of verification such as the hardware model M. The data interdependent between the hardware model M and the user program P is exchanged through, for example, the channel C. In response to the request from the channel C, for example, the HW simulator 322 executes or suspends the execution of the process between the hardware model M and the user program P operating in parallel to each other.

The user program P and the hardware model M are compiled and the binary is generated for the computer for executing the simulation such as the simulation apparatus 200. The binary and the simulation library 320 are linked to generate an execution file. The execution file is executed thereby to conduct the simulation of the user program P and the hardware model M.

FIG. 4 illustrates an exemplary user program. The user program P1 may be a software program described in the C language. In the user program P1, the read function or the write function may be used as an interface with the hardware model M.

The channel number of the channel C used for exchanging data with the hardware model M is described in the read function or the write function. The channel number "C1" of the channel C1 used for exchanging data with the hardware model M is described in the read function of the source code 401, for example. In the user program P1, all the API of the OSEK may be called, and the behavior of the API of the OSEK may be substantially identical or similar to the specification.

FIG. 5 illustrates an exemplary hardware model. The hardware model M may be a model of the hardware described in the system C. In the hardware model M, the read function or the write function may be used as an interface with the user program P1.

The channel number of the channel C used for exchanging data with the user program P1 is described in the read function or the write function. The channel number "C1" of the channel C1 used for exchanging data with the user program P1 is described in the write function of the source code 501, for example.

Figure 6:
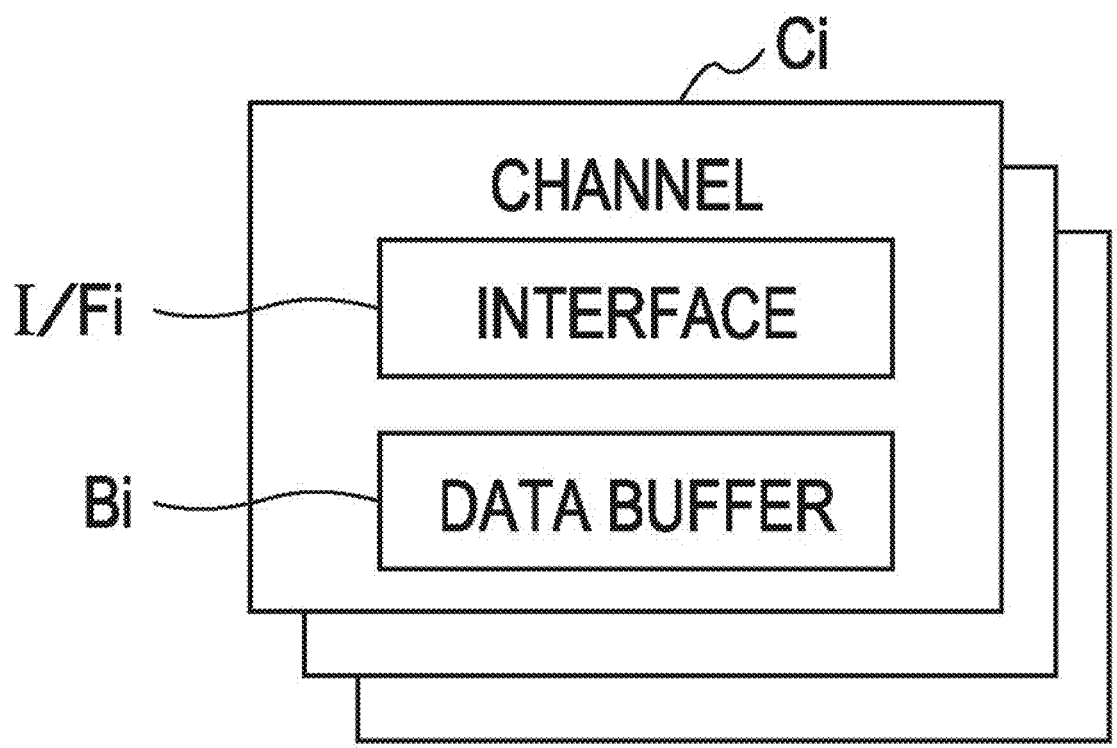
FIG. 6 illustrates an exemplary channel.

An arbitrary channel Ci included in the plurality of channels C1 to Cn is explained as an example. FIG. 6 illustrates an exemplary channel. The channel Ci, for example, included in the plurality of the channels C1 to Cn includes an interface I/Fi and a data buffer Bi.

The interface I/Fi accepts the write request or the read request from the user program P or the hardware model M. The data buffer Bi may be a storage area assigned to the channel Ci, and may be used to write or read the data between the user program P and the hardware model M.

The data buffer Bi includes the storage area such as a RAM 203, a magnetic disk 205 or an optical disk 207 illustrated in FIG. 2. The channel Ci includes one of the initial state, the write waiting state and the read waiting state. The state of the channel Ci is managed by the status table 700 illustrated in FIG. 7.

FIG. 7 illustrates an exemplary status table. The status table 700 includes the field items of the channel number and the state. In the status table, the information is set in the field items, and the state of each of the channels C1 to Cn is stored as a record.

The channel number may be an identifier for identifying the channels C1 to Cn. The state may be that of the channels C1 to Cn. As the field items of the state, an initial state flag, a write waiting flag and a read waiting flag are set. The initial state flag, the write waiting flag or the read waiting flag, whichever is turned on, indicates the state of the channels C1 to Cn.

Before execution of the simulation, the state of the channels C1 to Cn is initialized. The status table 700 may be stored in the storage area of the RAM 203, the magnetic disk 205 or the optical disk 207, for example, illustrated in FIG. 2.

Figure 8:
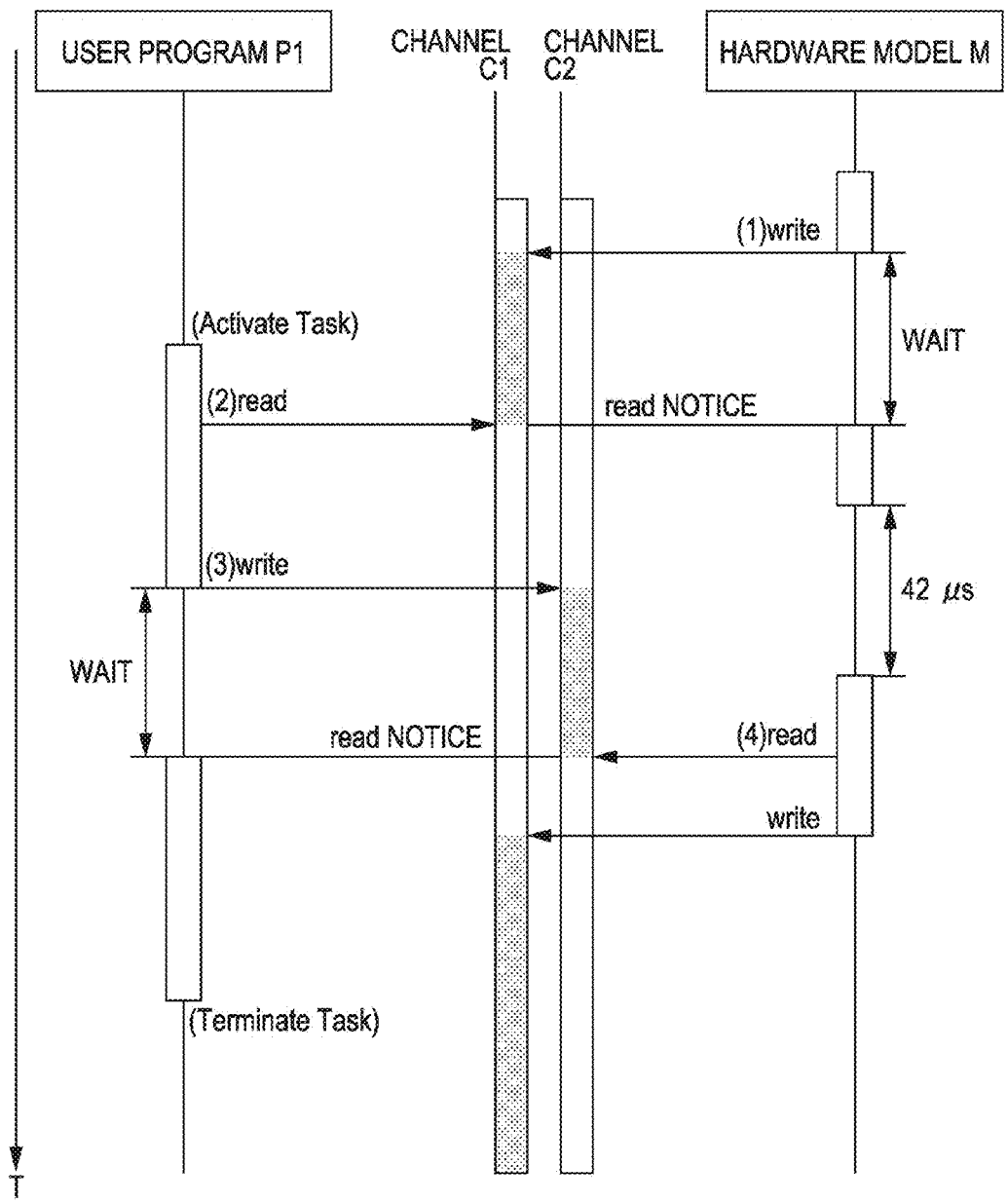
FIG. 8 illustrates an exemplary operation sequence.

FIG. 8 illustrates an exemplary operation sequence. The operation sequence illustrated in FIG. 8 may be the operation sequence of the user program P1 illustrated in FIG. 4 and the hardware model M illustrated in FIG. 5. The time axis T in FIG. 8 indicates the simulation time.

(1) The hardware model M writes the data in the data buffer B1 of the channel C1 (the source code 501 in FIG. 5). The hardware model M enters the read waiting state for the channel C1. The hardware model M stands by without executing the next process such as the source code 502 illustrated in FIG. 5 during the period before the user program P1 reads the data from the data buffer B1 of the channel C1.

(2) The user program P1 reads the data from the channel C1 (the source code 401 in FIG. 4). The read notice is given to the hardware model M. The hardware model M1 in the read waiting state for the channel C1 may execute the next process.

(3) The user program P1 writes the data in the channel C2 (the source code 402 in FIG. 4). The user program P1 enters the read waiting state for the channel C2. The user program P1 stands by without executing the next process during the period before the hardware model M reads the data from the data buffer B2 of the channel C2.

(4) The hardware model M reads the data from the channel C2 (the source code 503 in FIG. 5). The read notice is given to the user program P1. The user program P1 in the read waiting state for the channel C2 may execute the next process.

In the scheduling illustrated in (1) above, the hardware model M is rendered to stand by during the period before the user program P reads the data from the data buffer B1 of the channel C1. In the scheduling illustrated in (3), the user program P1 is rendered to stand by during the period before the hardware model M reads the data from the data buffer B2 of the channel C2.

Figure 9:
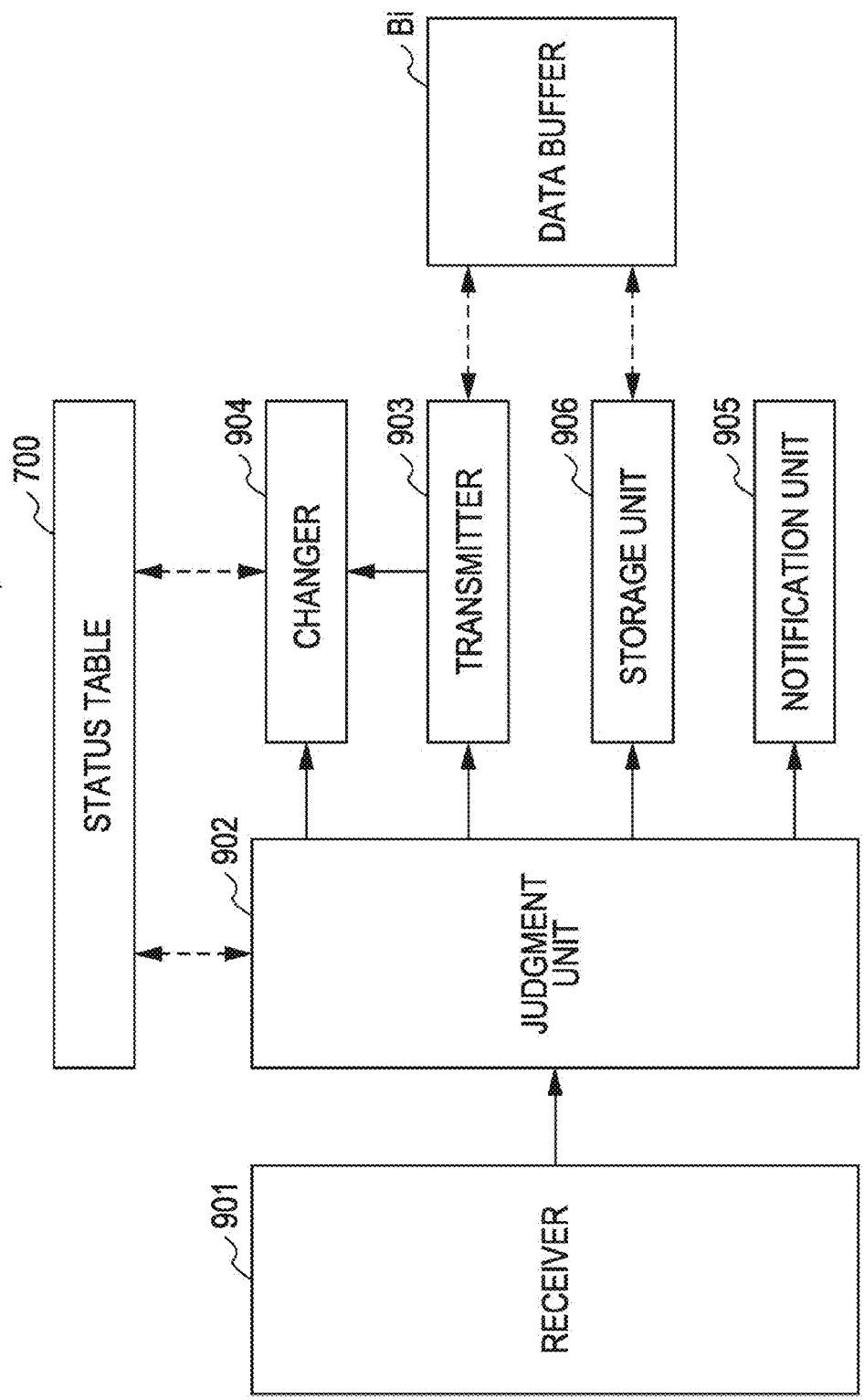
FIG. 9 illustrates an exemplary simulation apparatus.

FIG. 9 illustrates an exemplary simulation apparatus. The simulation apparatus illustrated in FIG. 9 constructs the simulation system 300 illustrated in FIG. 3, for example, and executes the simulation of the hardware model M and the user program P. The simulation apparatus 200 includes a receiver 901, a judgment unit 902, a transmitter 903, a changer 904, a notification unit 905 and a storage unit 906. The component parts ranging from the receiver 901 to the storage unit 906 cause the CPU 201 to execute the program stored in the storage area of, for example, the ROM 202, the RAM 203, the magnetic disk 205 and the optical disk 207 illustrated in FIG. 2, or controls the I/F 209.

The receiver 901, during the execution of the cooperative simulation, receives the access request from an accessor such as the hardware model M or the user program P to an accessee through the channel Ci (i=1, 2, ..., n). For example, the receiver 901 receives the read request or the write request from the accessor to the accessee through the interface I/Fi of the channel Ci.

The read request or the write request includes the channel number "Ci", for example. Therefore, the channel Ci used for exchanging the data is recognized. The reception result may be stored in the storage area of the RAM 203, the magnetic disk 205 or the optical disk 207 illustrated in FIG. 2.

The judgment unit 902, upon reception of the read request, judges whether the state of the channel Ci stored in the status table 700 illustrated in FIG. 7 is the read waiting state or not. For example, the judgment unit 902 judges whether the read waiting state flag of the channel Ci is in an on-state, based on the channel number included in the read request with reference to the status table 700. The judgment result may be stored in the storage area of the RAM 203, the magnetic disk 205 or the optical disk 207.

The transmitter 903, when judging to be the read waiting state, transmits the data stored in the data buffer Bi assigned to the channel Ci to the accessor. For example, the transmitter 903 transmits the data stored in the data buffer Bi to the accessor through the interface I/Fi of the channel Ci.

The changer 904, based on the data transmission, changes the state of the channel Ci stored in the status table 700 to the initial state. For example, the changer 904 turns off the read waiting state flag of the channel Ci in the status table 700 and turns on the initial state flag.

FIG. 10 illustrates an exemplary change process. In FIG. 10A, based on the data transmission to the accessor, the read waiting state flag of the channel Ci is turned from on to off, and the initial state flag is turned from off to on.

The notification unit 905, when receiving the read request and judging to be the read waiting state, transmits the read notice indicating the acceptance of the read request for the data buffer Bi assigned to the channel Ci to the accessee. For example, the transmitter 903 transmits the read notice to the accessee through the interface I/Fi of the channel Ci. The accessee in the read waiting state for the data stored in the data buffer Bi may execute the next process.

The changer 904, when receiving the read request and judging not to be the read waiting state, changes the state of the channel Ci stored in the status table 700 to the write waiting state. As illustrated in FIG. 10B, for example, the changer 904 turns off the initial state flag of the channel Ci in the status table 700 and turns on the write waiting state flag.

In FIG. 10B, when receiving the read request and judging not to be the read waiting state, the initial state flag of the channel Ci is turned from on to off, and the write waiting state flag is turned from off to on. The accessor enters the write waiting state for the data of the data buffer B1, and stands by without executing the next process.

The judgment unit 902, upon reception of the write request, judges whether the state of the channel Ci is the write waiting state or not. For example, the judgment unit 902, based on the channel number included in the write request with reference to the status table 700, judges whether the write waiting state flag of the channel Ci is in the on-state.

The storage unit 906, when receiving the write request and judging to be the write waiting state, stores the data in the data buffer Bi assigned to the channel Ci. The storage unit 906, for example, stores the data included in the write request in the data buffer Bi. The accessor writes the data in the accessee.

The changer 904, based on the data storage, changes the state of the channel Ci stored in the status table 700 to the read waiting state. As illustrated in FIG. 10C, for example, the changer 904 turns off the write waiting state of the channel Ci in the status table 700 and turns on the read waiting state flag (FIG. 10C).

In FIG. 10C, when receiving the write request and judging to be the write waiting state, the write waiting state of the channel Ci is turned from on to off and the read waiting state flag is turned from off to on. The accessor enters the read waiting state for the data stored in the data buffer Bi and stands by without executing the next process.

The notification unit 905, when receiving the write request and judging to be the write waiting state, transmits the write notice indicating the acceptance of the write request for the data buffer Bi assigned to the channel Ci to the accessee. For example, the notification unit 905 transmits the write notice to the accessee through the interface I/Fi of the channel Ci. The accessee in the write waiting state for the data in the data buffer Bi may execute the next process.

The storage unit 906, when receiving the write request and judging not to be the write waiting state, stores the data in the data buffer Bi assigned to the channel Ci. For example, the storage unit 906 stores the data included in the write request in the data buffer Bi.

The changer 904, when accepting the write request and judging not to be the write waiting state, changes the state of the channel Ci stored in the status table 700 to the read waiting state. As illustrated in FIG. 10C, for example, the changer 904 turns off the initial state flag of the channel Ci in the status table 700 and turns on the read waiting state flag.

In FIG. 10D, when receiving the write request and judging to be the write waiting state, the initial state of the channel Ci is turned from on to off and the read waiting state flag is turned from off to on. The accessor enters the read waiting state for the data stored in the data buffer Bi and stands by without executing the next process.

The hardware model M and the user program P, for example, the task ISR may be coupled in one-to-one relation. As a result, the write request using the channel Ci in the read waiting state, for example, may not occur. The read request using the channel Ci in the write waiting state may neither occur.

Figure 11:
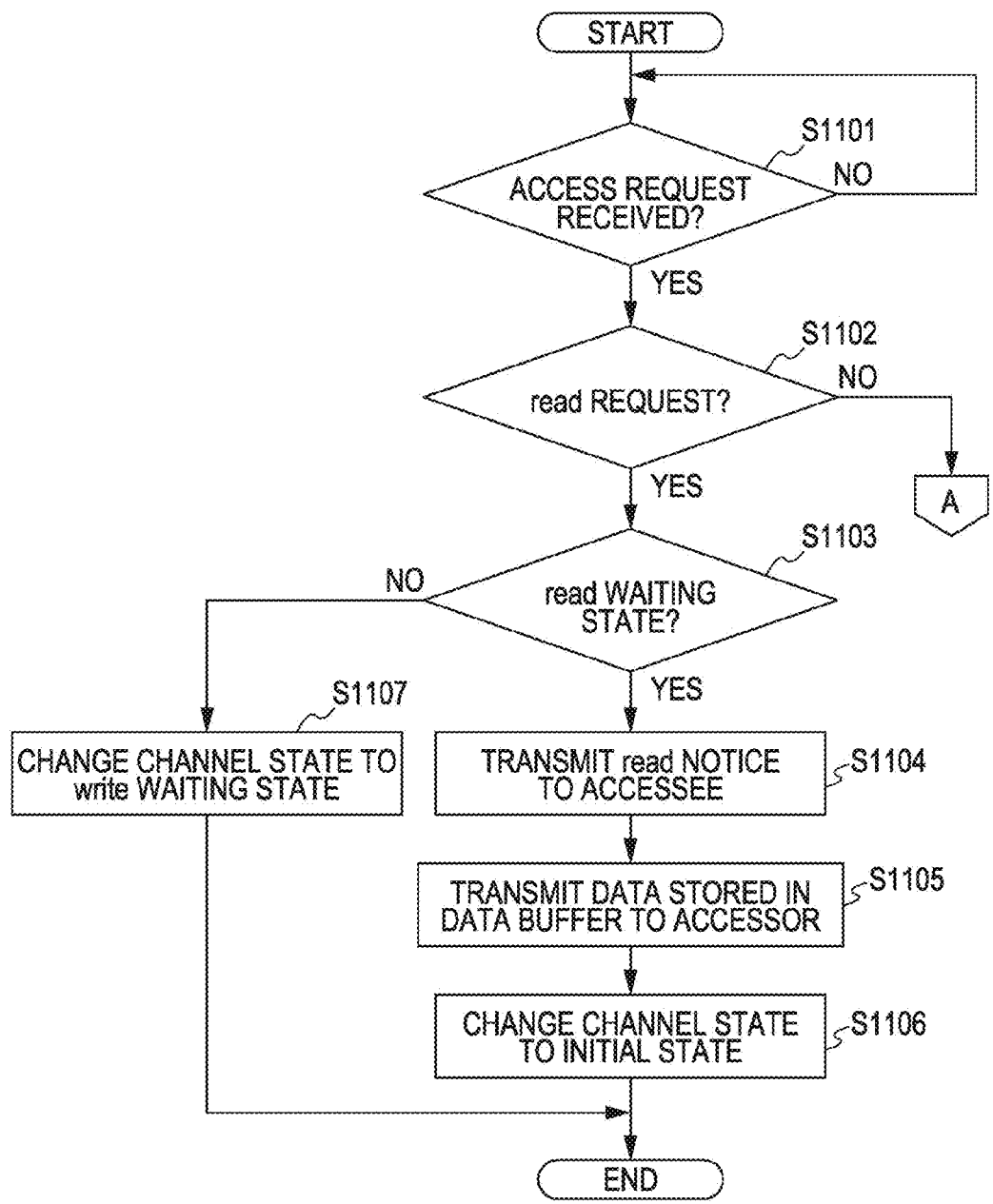
FIG. 11 illustrates an exemplary simulation process.
Figure 12:
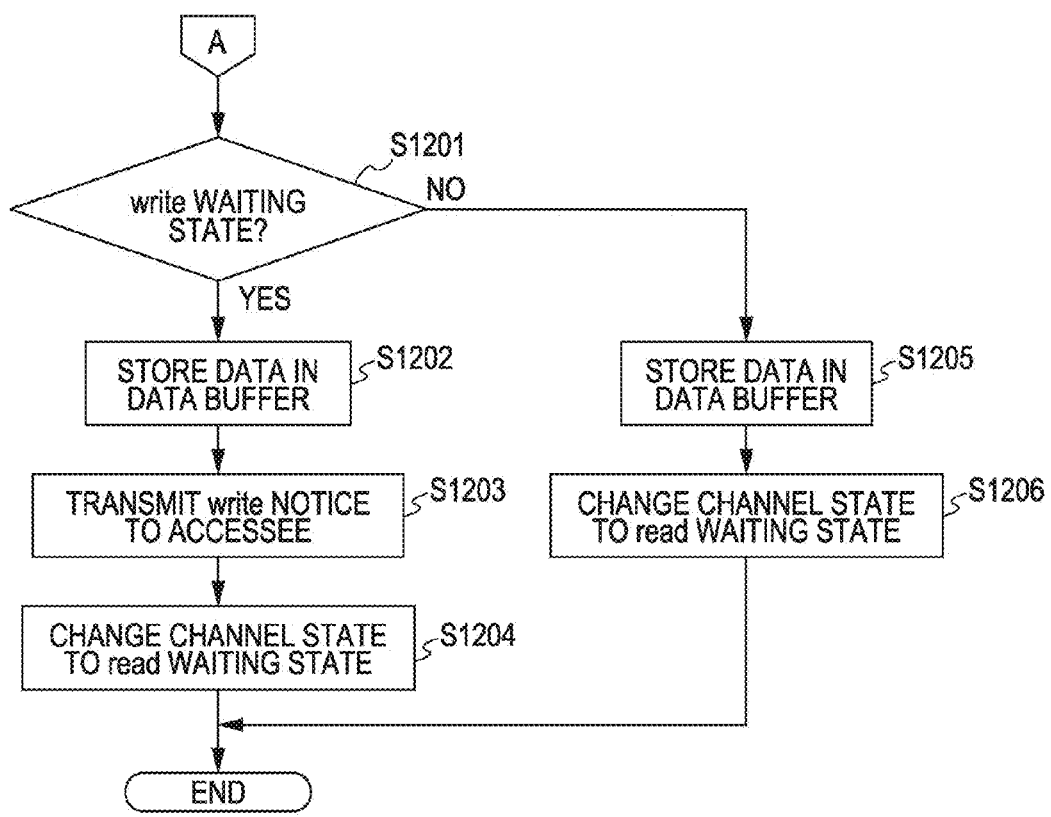
FIG. 12 illustrates an exemplary simulation process.

FIGS. 11 and 12 illustrate an exemplary simulation process. The simulation apparatus 200 illustrated in FIG. 9 may execute the simulation process illustrated in FIGS. 11 and 12.

In the flowchart of FIG. 11, the receiver 901 judges whether the access request to the accessee from the accessor, for example, one of the hardware model M and the user program P is received through the channel Ci or not during the execution of the cooperative simulation (operation S1101).

Waiting for the reception of the access request (NO in operation S1101), when the access request is received (YES in operation S1101), the judgment unit 902 judges whether the access request is the read request or not (operation S1102).

When the access request is the write request (NO in operation S1102), the process proceeds to the operation S1201 illustrated in FIG. 12. When the access request is the read request (YES in operation S1102), the judgment unit 902 judges whether the state of the channel Ci stored in the status table 700 is the read waiting state or not (operation S1103).

When judging to be the read waiting state (YES in operation S1103), the notification unit 905 transmits, to the accessee, the read notice indicating that the read request for the data buffer Bi assigned to the channel Ci is accepted (operation S1104). The transmitter 903 transmits to the accessor the data stored in the data buffer Bi assigned to the channel Ci (operation S1105).

The changer 904 changes the state of the channel Ci stored in the status table 700 to the initial state (operation S1106) and thus ends the process. When judging not to be the read waiting state in operation S1103 (NO in operation S1103), the state of the channel Ci stored in the status table 700 is changed to the write waiting state (operation S1107), and the process is ended.

In the flowchart of FIG. 12, the judgment unit 902 judges whether the state of the channel Ci is the write waiting state or not (operation S1201). When judging that the channel Ci is in the write waiting state (YES in operation S1201), the data included in the write request is stored by the storage unit 906 in the data buffer Bi assigned to the channel Ci (operation S1202).

The notification unit 905 transmits the write notice to the accessee indicating that the write request for the data buffer Bi assigned to the channel Ci is accepted (operation S1203). The changer 904 changes the state of the channel Ci stored in the status table 700 to the read waiting state (operation S1204) and ends the process.

When judging to be the write waiting state in operation S1201 (NO in operation S1201), the data included in the write request is stored by the storage unit 906 in the data buffer Bi assigned to the channel Ci (operation S1205). The changer 904 changes the state of the channel Ci stored in the status table 700 to the read waiting state (operation S1206) and ends the process.

According to the embodiments, the access between HW and SW is controlled based on the state of the channels C1 to Cn coupled in one-to-one relation thereby guaranteeing the order in which the data is exchanged. As a result, the scheduling is carried out at the timing of exchanging the data interdependent between HW and SW.

For example, the number of times the scheduling is carried out may be reduced. Thus, the overhead in the scheduler is reduced, resulting in a higher speed of software execution.

According to the embodiments, the computer such as a personal computer or a work station executes the program prepared in advance. The program is recorded in a computer-readable recording medium such as a hard disk, a flexible disk, a CD-ROM, an MO or a DVD, and read by the computer. The program may be distributed through the network such as the internet.

Example embodiments of the present invention have now been described in accordance with the above advantages. It will be appreciated that these examples are merely illustrative of the invention. Many variations and modifications will be apparent to those skilled in the art.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable recording medium that stores therein a simulation program to execute a simulation of first and second simulation objects, the simulation program causing a computer to execute operations of:
   storing one of an initial state, a read waiting state and a write waiting state for a channel used for data transfer between the first simulation object and the second simulation object;
   receiving a read request from the first simulation object to the second simulation object through the channel during the simulation;

judging whether a state corresponding to the channel is the read waiting state or not when receiving the read request;

transmitting data from the second simulation object stored in a channel storage area to the first simulation object when judging the state corresponding to the channel is the read waiting state; and changing the state corresponding to the channel to the initial state based on the data transmission.

2. The non-transitory computer-readable recording medium according to claim 1, the simulation program further causing the computer execute:

sending a read notice indicating the acceptance of the read request to the first simulation object when judging the state corresponding to the channel is the read waiting state.

3. The non-transitory computer-readable recording medium according to claim 1, the simulation program further causing the computer execute:

changing the state corresponding to the channel to the write waiting state when judging the state corresponding to the channel is not the read waiting state.

4. The non-transitory computer-readable recording medium according to claim 1, the simulation program further causing the computer execute:

receiving a write request for the first simulation object from the first simulation object through the channel during the simulation;

judging whether the state corresponding to the channel is the write waiting state or not when receiving the write request;

storing the data from the first simulation object to be transferred to the second simulation object in the storage area when judging the state corresponding to the channel is the write waiting state; and changing the state corresponding to the channel to the read waiting state when storing the data to be transferred from the first simulation object to the second simulation object in the storage area.

5. The non-transitory computer-readable recording medium according to claim 4, the simulation program further causing the computer execute:

sending a write notice to the first simulation object indicating the acceptance of the write request to the first simulation object when judging the state corresponding to the channel is the write waiting state.

6. The non-transitory computer-readable recording medium according to claim 4, the simulation program further causing the computer execute:

changing the state corresponding to the channel to the read waiting state when judging the state corresponding to the channel is not the write waiting state.

7. The non-transitory computer-readable recording medium according to claim 1, wherein the first simulation object and the second simulation object include at least one of the software and the hardware.

8. A non-transitory computer-readable recording medium that stores therein a simulation program to execute a simulation of first and second simulation objects, the simulation program causing a computer to execute operations of:

storing one of an initial state, a read waiting state and a write waiting state for a channel used for data transfer between the first simulation object and the second simulation object;

receiving a write request from the first simulation object to the second simulation object through the channel during the simulation;

judging whether a state corresponding to the channel stored is the write waiting state or not when receiving the write request;

storing data from the first simulation object to be transferred to the second simulation object in a channel storage when judging the state corresponding to the channel is the write waiting state;

transmitting the data from the first simulation object stored in the channel storage to the second simulation object; and changing the state corresponding to the channel to the initial state based on the data transmission.

9. The non-transitory computer-readable recording medium according to claim 8, the simulation program further causing the computer execute:

sending a write notice indicating an acceptance of the write request to the first simulation object when judging the state corresponding to the channel is the write waiting state.

10. The non-transitory computer-readable recording medium according to claim 8, the simulation program further causing the computer execute:

changing the state corresponding to the channel to the read waiting state when judging the state corresponding to the channel is not the write waiting state.

11. The non-transitory computer-readable recording medium according to claim 9, the simulation program further causing the computer execute:

receiving a read request for the second simulation object from the first simulation object through the channel during the simulation;

judging whether the state corresponding to the channel stored is the read waiting state or not when receiving the read request;

transmitting data from the second simulation object to the first simulation object when judging the state corresponding to the channel is the read waiting state; and changing the state corresponding to the channel to the initial state based on the data transmission.

12. The non-transitory computer-readable recording medium according to claim 11, the simulation program further causing the computer execute:

sending a read notice indicating the acceptance of the read request to the first simulation object when judging the state corresponding to the channel is the read waiting state.

13. The non-transitory computer-readable recording medium according to claim 11, the simulation program further causing the computer execute:

changing the state corresponding to the channel to the write waiting state when judging the state corresponding to the channel is not the read waiting state.

14. The non-transitory computer-readable recording medium according to claim 8, wherein the first simulation object and the second simulation object include at least one of the software and the hardware.

15. A simulation apparatus for executing a simulation of first and second simulation objects, comprising:

a channel for data transfer between the first simulation object and the second simulation object; and a simulator which executes and suspends the simulation the first and second simulation objects in accordance with a request from the channel;

wherein the channel includes:

storing one of an initial state, a read waiting state and a write waiting state;

a receiver which receives a read request or a write request for the second simulation object from the first simulation object through the channel during the simulation;

a judgment unit which judges whether the state corresponding to the channel is the read waiting state or the write waiting state when receiving the read request or the write request;

a transmitter which transmits data from the second simulation object stored in a storage area to the first simulation object when judging the state corresponding to the channel is the read waiting state;

a storing unit which stores the data from the first simulation object to be transferred to the second simulation object in the storage area when judging the state corresponding to the channel is the write waiting state; and a changer which changes the state corresponding to the channel to the initial state based on the data transmission or the data storage.

16. The simulation apparatus according to claim 15, wherein the first simulation object and the second simulation object include at least one of software and hardware.

* * * * *